United States Patent [19]

Anstett

[11] 4,220,070

[45] Sep. 2, 1980

[54] NAILING STRIP FOR NAILS TO BE DRIVEN THEREFROM

[76] Inventor: Edgar P. Anstett, 21 Lakewood Pl., Highland Park, Ill. 60035

[21] Appl. No.: 876,746

[22] Filed: Feb. 10, 1978

[51] Int. Cl.² ............................................. F16B 15/08
[52] U.S. Cl. .......................................... 85/49; 85/11; 85/13; 85/17; 85/21
[58] Field of Search .................. 85/49, 13, 11, 18, 17, 85/21; 29/413; 248/DIG. 9

[56] References Cited

U.S. PATENT DOCUMENTS

| | | | |
|---|---|---|---|
| 1,407,709 | 2/1922 | Tibbals | 85/49 |
| 1,581,887 | 4/1926 | Taplin | 85/49 X |
| 1,727,574 | 9/1929 | Tibbals | 85/49 X |
| 2,174,708 | 10/1939 | Sears et al. | 85/49 X |
| 2,242,967 | 5/1941 | Carlile | 85/49 X |
| 2,293,862 | 8/1942 | Sorenson | 85/13 |
| 3,170,279 | 2/1965 | Dubini | 85/49 |
| 3,757,629 | 9/1973 | Schneider | 85/49 |
| 3,800,653 | 4/1974 | Barth et al. | 85/13 |
| 3,883,923 | 5/1975 | England | 248/DIG. 9 |

FOREIGN PATENT DOCUMENTS 366425  2/1963  Switzerland ................................. 85/49

Primary Examiner—Rodney H. Bonck
Attorney, Agent, or Firm—Wallenstein, Spangenberg, Hattis & Strampel

[57] ABSTRACT

A nailing strip for use in a nailing machine comprises an elongated stamped and formed sheet metal strip of nails which includes a plurality of substantially rectangular nail heads integrally interconnected along the length of the strip by integral interconnecting portions at the transverse edges of the nail heads, and a pair of nail shanks integrally extending at substantially right angles from each of the nail heads of the strip at the longitudinal edges of the nail heads. The integral interconnecting portions of the strip are swaged to increase the width thereof and decrease the thickness thereof for increasing the spacing along the strip between the nail shanks of the nails and for facilitating separation of the nails from the nailing strip, they also contain transverse grooves for providing fracture lines for the ready separation of the nails from the nailing strip, they also have central sections which are offset for adding strength and rigidity to the nailing strip, and they are provided at their longitudinal edges with inwardly extending notches which form stops for controlling the advance of the nailing strip in the nailing machine. The nailing strip where the nail shanks integrally extend from the nails heads are also provided with offsets which rigidify and reinforce the substantially right angle relation between the nail heads and the nail shanks. The nail shanks of the nailing strip are tapered as they extend from the nail heads and the edges of the nail shanks are provided with barbs.

7 Claims, 14 Drawing Figures

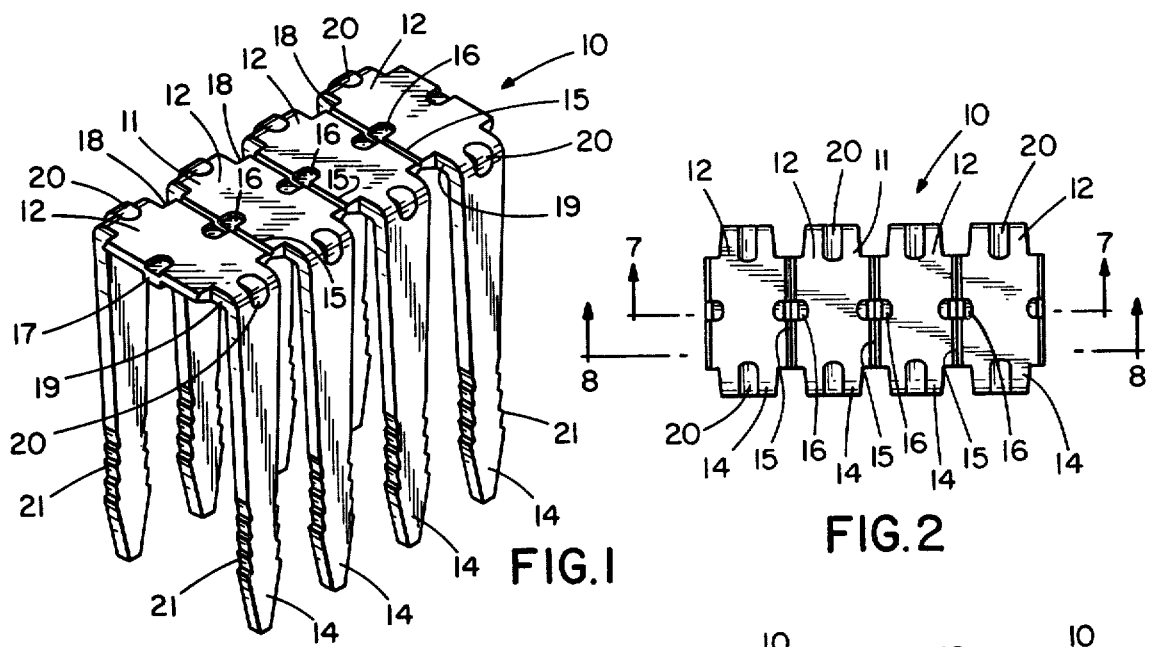
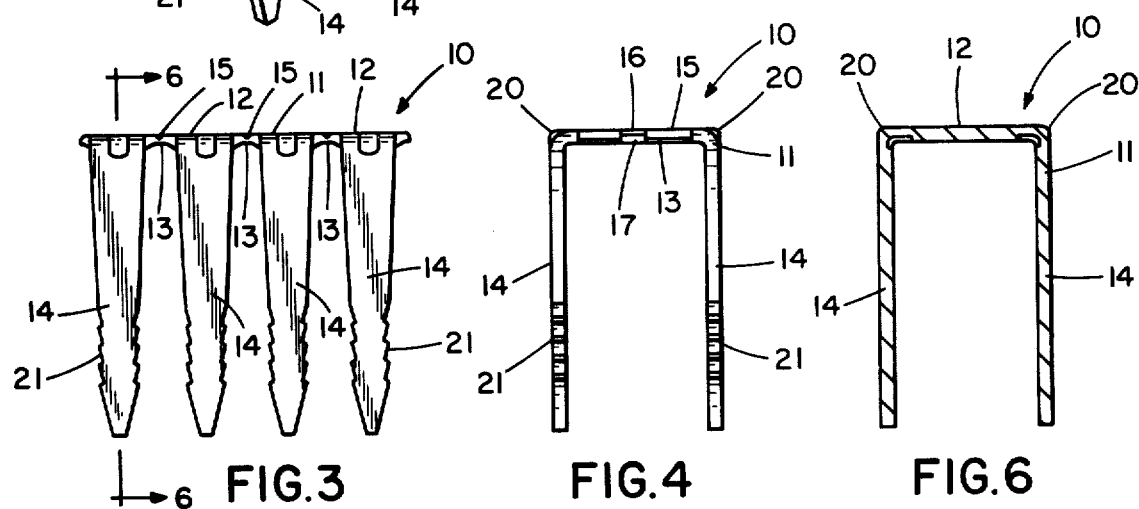
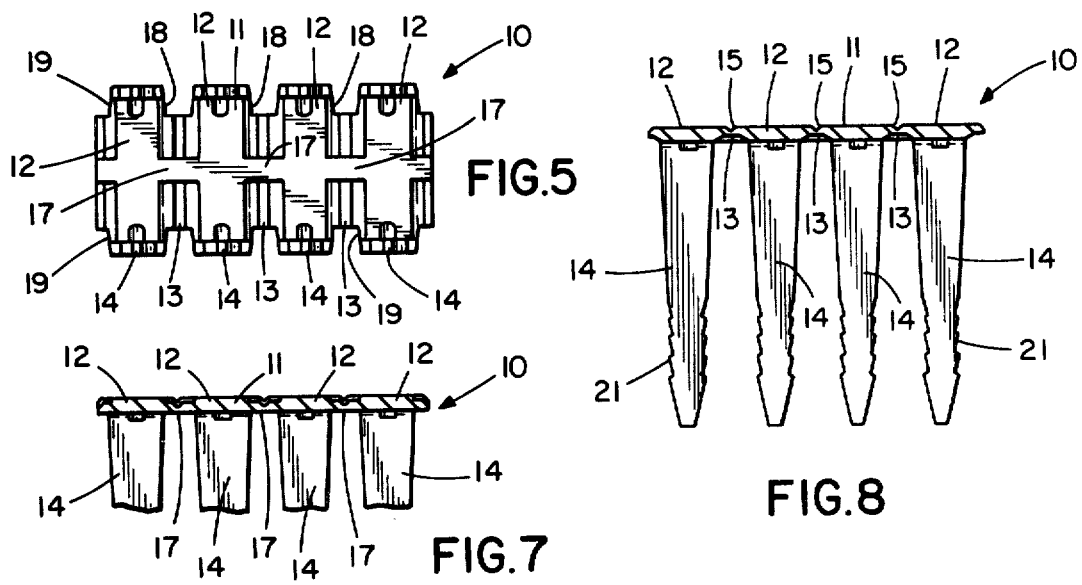

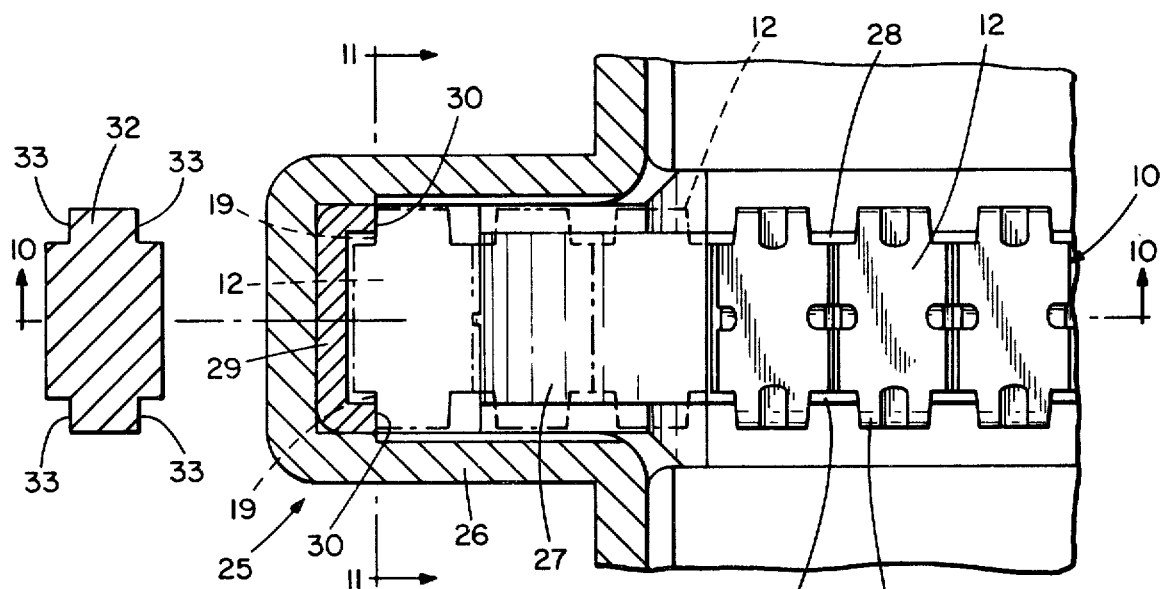
FIG. 9
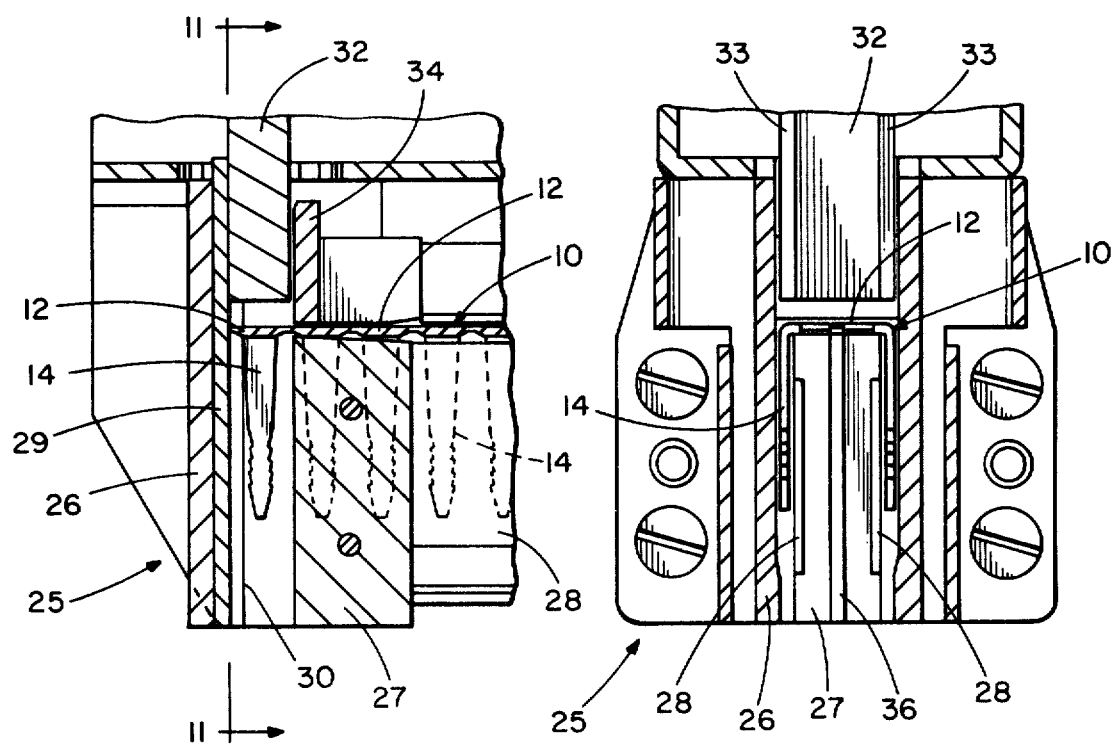
FIG. 10
FIG. 11

NAILING STRIP FOR NAILS TO BE DRIVEN THEREFROM

The principal object of this invention is to provide an improved nailing strip for use in a nailing machine, which, among other things, is particularly adaptable for nailing roofing shingles or the like, wherein the nailing strip is inexpensive to manufacture, it being stamped and formed from a sheet metal strip, wherein the nailing strip may be readily handled and inserted in a nailing machine without fear of disruption or breakage, and wherein nails may be readily individually severed and driven from the nailing strip in a suitable nailing machine in a fool proof and efficient manner.

Briefly, in accordance with this invention, the nailing strip comprises an integral elongated stamped and formed sheet metal strip of nails which is preferably an inexpensive sheet steel strip which is treated by galvanizing or the like for resisting corrosion thereof. The sheet metal strip of nails includes a plurality of substantially rectangular nail heads integrally interconnected along the length of the strip by integral interconnecting portions at the transverse edges of the nail heads, and a pair of nail shanks integrally extending at substantially right angles from each of the nail heads of the strip at the longitudinal edges of the nail heads. The integral interconnecting portions of the strip at the transverse edges of the nail heads are preferably swaged to increase substantially the width thereof and decrease substantially the thickness thereof for increasing the spacing along the strip between the nail shanks of the nails and for facilitating separation of the nails from the nailing strip. By increasing the width of the interconnecting portions of the nailing strip by swaging, the area of the nail heads may readily be increased and the spacing between the nail shanks increased so as to provide a maximum number of nails in a nailing strip with a minimum amount of sheet metal for forming the same. By decreasing the thickness of the transverse edges of the nail eads by swaging, separation of the nails from the nailing strip in a nailing machine is readily facilitated.

The integral interconnecting portions of decreased thickness of the strip at the transverse edges of the nail heads preferably have transverse grooves for providing fracture lines therein for the ready separation of the nails from the nailing strip. The integral interconnecting portions of the decreased thickness of the strip at the transverse edges of the nail heads also preferably have central sections thereof which are offset for adding strength and rigidity to the nailing strip so that the nailing strip may be readily handled and inserted in a nailing machine without fear of disruption or breakage of the strip.

The integral interconnecting portions of the strip between the nail shanks extending from the nail heads are preferably provided at their longitudinal edges with inwardly extending notches which form stops for controlling the advance of the nailing strip in the nailing machine. The longitudinal edges of the nail heads and the nail shanks where they extend at substantially right angles from the nail heads are preferably provided with offsets which rigidify and reinforce the substantially right angle relation between the nail heads and the nail shanks. The nail shanks of the nailing strip are preferably tapered as they extend from the nail heads and terminate substantially in points, and the edges of the nail shanks are preferably provided with barbs for locking the same in the material into which the nails are driven.

The nailing machine for sequentially severing and driving nails from the aforementioned nailing strip may be hammer operated or power operated, as desired, and in either event it includes an anvil over which the nailing strip is sequentially advanced and beyond which a nail of the nailing strip extends, and a reciprocatable plunger corresponding in transverse configuration substantially to the configuration of the nail heads of the nailing strip and arranged adjacent the anvil for severing the nail extending from the nailing strip beyond the anvil and for driving the severed nail. The extending nail is preferably severed along the fracture line in the integral interconnecting portion of the nailing strip. The anvil of the nailing machine also preferably has a central projection cooperating with the reciprocatable plunger for substantially shearing the offset central section of the integral interconnecting portion of the nail extending from the nailing strip.

The nailing machine also preferably has a pair of spaced guides which are engaged by the stops in the nail extending from the nailing strip and formed by the notches in the nailing strip for controlling the advance of the nailing strip in the nailing machine. The plunger which has a configuration generally corresponding to the configuration of the nail heads of the nailing strip has recesses in the corners thereof so as to be at least partially guided by the pair of spaced guides which are engaged by the stops in the nail extending from the nailing strip.

Other objects of this invention reside in the details of construction of the nailing strip and of the nailing machine and in the cooperative relationships between the component elements or parts thereof.

Further objects of this invention will become apparent to those skilled in the art upon reference to the accompanying specification, claims and drawings in which:

FIG. 1 is a perspective view of a portion of the elongated nailing strip of this invention.

FIG. 2 is a top plan view of the nailing strip illustrated in FIG. 1.

FIG. 3 is a side elevational view of the nailing strip illustrated in FIG. 1.

FIG. 4 is an end elevational view of the nailing strip illustrated in FIG. 1.

FIG. 5 is a bottom plan view of the nailing strip illustrated in FIG. 1.

FIG. 6 is a sectional view taken through a nail of the nailing strip substantially along the line 6—6 of FIG. 3.

FIG. 7 is a sectional view through the nailing strip taken substantially along the line 7—7 of FIG. 2.

FIG. 8 is a sectional view taken substantially along the line 8—8 of FIG. 2.

FIG. 9 is a schematic horizontal sectional view of a nailing machine for severing and driving nails from a nailing strip such as illustrated in FIGS. 1 to 8 and also including a displaced sectional view of the reciprocatable plunger.

FIG. 10 is a vertical sectional view taken substantially along the line 10—10 of FIG. 9 and illustrating the plunger in its raised position.

FIG. 11 is a vertical sectional view taken substantially along the lines 11—11 of FIGS. 9 and 10.

Figure 12:
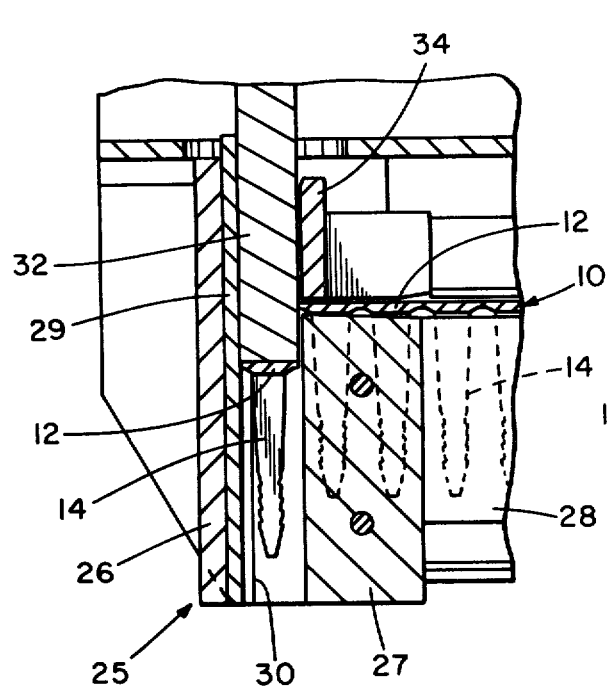
FIGS. 12 and 13 are sectional views similar to FIGS. 10 and 11 but illustrating the extending nail of the nailing strip being severed from the nailing strip and being driven by the reciprocatable plunger.

Referring first to FIGS. 1 to 8, the nailing strip of this invention is generally designated at 10. It includes an elongated stamped and formed sheet metal strip 11 which is preferably an inexpensive sheet steel strip or the like which is treated by galvanizing or the like for resisting corrosion thereof. The sheet metal strip of nails includes a plurality of substantially rectangular nail heads 12 which are integrally interconnected along the length of the strip by integral interconnecting portions 13 at the transverse edges of the nail heads, and a pair of nail shanks 14 integrally extending at substantially right angles from each of the nail heads 12 of the strip at the longitudinal edges of the nail heads. The integral interconnecting portions 13 of the strip at the transverse edges of the nail heads 12 are preferably swaged so as, by metal flow, to increase substantially the width thereof and decrease substantially the thickness thereof. This swaging operates to increase the spacing along the strip 11 between the nail shanks 14 of the nails and to facilitate separation of the nails from the nailing strip. By so increasing the width of the interconnecting portions 13 of the nailing strip, the area of the nail heads 12 may readily be increased and the spacing between the nail shanks 14 increased so as to provide a maximum number of nails in a nailing strip with a minimum amount of sheet metal for forming the same. By decreasing the thickness of the transverse edges of the nail heads by swaging, separation of the nails from the nailing strip in a nailing machine is readily facilitated. The swaging of the interconnecting portions of the nailing strip is preferably accomplished from the bottom side of the nailing strip 12.

The integral interconnecting portions 13 of decreased thickness of the strip 11 at the transverse edges of the nail heads 12 preferably have transverse grooves 15 for providing fracture lines therein for the ready separation of the nails from the nailing strip 11. The grooves 15 are preferably provided in the interconnecting portions 13 from the top side of the nailing strip 11. The integral interconnecting portions 13 of decreased thickness also preferably have central sections 16 thereof which are offset for adding strength and rigidity to the nailing strip so that the nailing strip may be readily handled and inserted in a nailing machine without fear of disruption or breakage of the nailing strip. The offsetting of the central sections 16 is preferably accomplished by swaging from the top side of the nailing strip 11 so that the bottoms of the central sections as indicated at 17 lie within the same plane as the bottom surfaces of the nail heads 12 as shown more clearly in FIGS. 5 and 7.

The integral interconnecting portions 13 of the strip 11 between the nail shanks 14 extending from the nail heads 12 are preferably provided at their longitudinal edges with inwardly extending notches 18 which form stops 19 for controlling the advance of the nailing strip 12 in the nailing machine. The longitudinal edges of the nail heads 12 and the nail shanks 14 where they extend at substantially right angles from the nail heads are preferably provided with offsets 20 which operate to rigidify and reinforce the substantially right angle relation between the nail heads and the nail shanks. This may be accomplished by a suitable forming operation from the underside of the nailing strip 11. The nail shanks 14 of the nailing strip 11 are preferably tapered as they extend from the nail heads 12 and terminate substantially in points, and the edges of the nail shanks 14 are preferably provided with barbs 21 for locking the same in the material into which the nails are driven.

Referring now to FIGS. 9 to 14, the nailing machine for sequentially severing and driving nails from the aforementioned nailing strip 10 is generally designated at 25. The nailing machine may be of the hammer operated type of power operated type, as desired, but in either event, it includes an anvil 27 over which the nailing strip 10 is sequentially advanced and beyond which a nail of the nailing strip extends, and a reciprocatable plunger 32 corresponding in transverse configuration substantially to the configuration of the nail heads 12 of the nailing strip and arranged adjacent the anvil for severing the nail extending from the nailing strip beyond the anvil and for driving the severed nail. The extending nail 12 is preferably severed along the fracture line in the integral interconnecting portion 13 of the nailing strip 10 formed by the groove 15 therein. The anvil 27 is carried by a machine frame 26 and is provided with guide extensions 28 by which the nailing strip 10 is guided and sequentially advanced over the anvil by means of suitable spring advancing means, not shown.

The frame 26 of the nailing machine also carries a generally channel shaped guide member 29 having a pair of spaced guides 30 which are engaged by the stops 30 in the nail head 12 extending from the nailing strip 10 and formed by the notches 18 in the nailing strip for controlling the advance of the nailing strip in the nailing machine. The pair of spaced guides 30 accurately position the nails of the nailing strip as they are advanced through the machine in cooperation with the stops 19 and the nailing strip. Thus, if there is any inaccuracy in the severing of a nail from the nailing strip, this will not affect the accurate positioning of the nails. The reciprocatable plunger 32 has a cross sectional configuration corresponding substantially to the configuration of the nail heads 12 of the nailing strip 10 and in this connection is provided at its corners with recesses or grooves 33. In its reciprocating movement, the plunger 32 is guided by the recesses or grooves 33 engaging the pair of spaced guides 30 on the guide member 29 and also by a guide membr 34 carried by the frame 26 above the anvil 27 and the nailing strip 10 supported thereby.

As will be noted, the anvil 27 preferably has a tapered upper surface and is provided at its forward end with a central vertical projection 36. The top of the projection 36 on the anvil 27 cooperates with the offset central section 17 of the nailing strip so as to prevent the extending nail from tilting downwardly between the anvil 27 and the guide 29. The rear side of the reciprocatable plunger 32 is in substantial alignment with the forward edge of the central projection 36 of the anvil 27 so as to provide a substantially shearing action at the offset central section 17 of the nailing strip when the extending nail is severed from the strip by the plunger.

Figure 13:
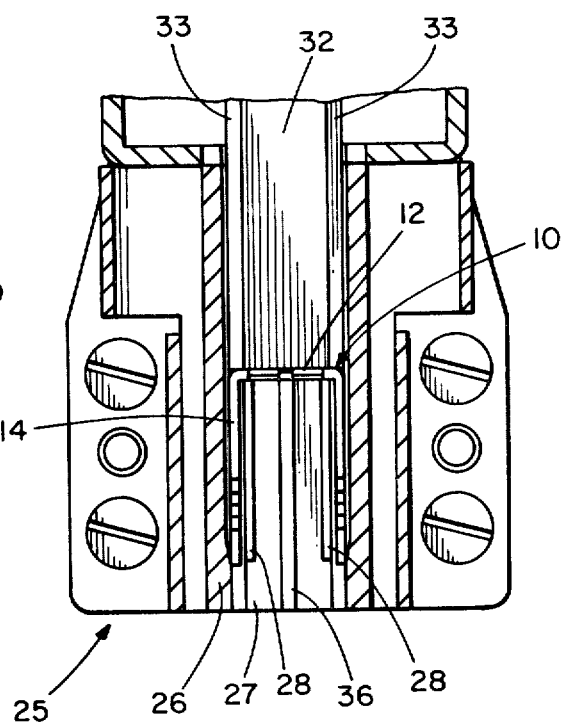
Figure 14:
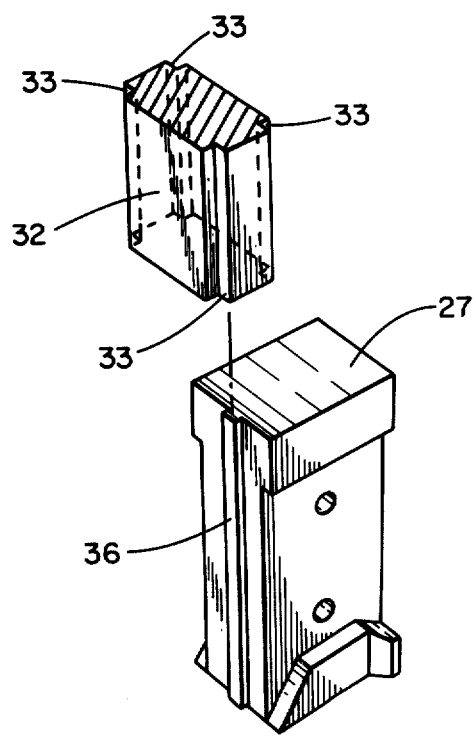
FIG. 14 is an exploded perspective view of the anvil and the reciprocatable plunger of the nailing machine illustrated in FIGS. 9 to 13.

FIGS. 9 to 11 show the plunger 32 in its elevated position and with a nail 12 extending forwardly from the nailing strip 10 at the anvil 27. When the plunger 32 is forced downwardly, as is shown in FIGS. 12 and 13, the plunger 32 fractures the extending nail 12 from the nailing strip along the fracture line formed by the groove 15 in the nailing strip and, accordingly, no shearing action is here involved. However, the plunger 32 cooperates with the central projection 36 on the anvil 27 to substantially shear the strip at the central section 17 thereof. In this way, the extending nail is readily severed from the nailing strip and is thereafter driven by the plunger 32 into the supporting material for the nail. When the plunger 32 is raised, the nailing strip 10 is advanced by the spring means, not shown, to extend the next succeeding nail thereof against the pair of spaced guides 30 for the next succeeding nailing operation.

The nailing strip 10 may be readily and inexpensively manufactured from sheet metal strip stock in a press operation by means of progressive dies which perform the desired punching and forming functions thereon. The nailing strip 10 may be supplied to users in desired lengths, as for example, containing fifty nails or so, which are readily adaptable for use in nailing machines, whether of the hammer operated or power operated types, for individually separating and driving nails from the nailing strip. The nailing strip 10 is particularly adaptable for nailing roofing shingles or the like.

While for purposes of illustration, a preferred embodiment of this invention has been disclosed, other embodiments thereof may become apparent to those skilled in the art and, accordingly, this invention is to be limited only by the scope of the appended claims.

I claim:

1. A nailing strip for use in a nailing machine comprising an integral elongated stamped and formed sheet metal strip of nails including a plurality of substantially rectangular nail heads integrally interconnected along the length of the strip by integral interconnecting portions of reduced thickness at the transverse edges of the nail heads, and a pair of nail shanks integrally extending at substantially right angles from one side of each of the nail heads of the strip at the longitudinal edges of the nail heads, the integral interconnecting portions of the strip at the transverse edges of the nail heads form recesses on said one side by being swaged from said one side to increase substantially the width thereof and decrease substantially the thickness thereof for increasing the spacing along the strip between the nail shanks of the nails thereof and for facilitating separation of the nails from the nailing strip, said integral interconnecting portions having central sections thereof which are offset toward said one side so that the bottoms of said central sections lie substantially within the same plane as the bottom surfaces of the nail heads for adding strength and rigidity to the nailing strip.

2. A nailing strip as defined in claim 1 wherein the other side of the integral interconnecting portions of decreased thickness of the strip at the transverse edges of the nail heads have transverse grooves providing fracture lines therein for the separation of the nails from the nailing strip.

3. A nailing strip as defined in claim 2 wherein the integral interconnecting portions of the strip at the transverse edges of the nail heads are centrally swaged from said other side of the strip to provide the central sections thereof which are offset for adding strength and rigidity to the nailing strip.

4. A nailing strip as defined in claim 1 wherein the integral interconnecting portions of the strip at the transverse edges of the nail heads are centrally swaged from said other side of the strip to provide the central sections thereof which are offset for adding strength and rigidity to the nailing strip.

5. A nailing strip as defined in claim 1 wherein the integral interconnecting portions of the strip between the nail shanks extending from the nail heads are provided at their longitudinal edges with inwardly extending notches which form stops for controlling the advance of the nailing strip in the nailing machine.

6. A nailing strip as defined in claim 1 wherein the longitudinal edges of the nail heads and the nail shanks where they integrally extend at substantially right angles from the nail heads are provided with offsets which rigidify and reinforce the substantially right angle relation between the nail heads and the nail shanks.

7. A nailing strip as defined in claim 1 wherein the nail shanks are tapered as they extend from the nail heads and the edges of the nail shanks are provided with barbs.

* * * * *